US011989461B2

(12) United States Patent
Smith et al.

(10) Patent No.: US 11,989,461 B2
(45) Date of Patent: May 21, 2024

(54) PREVENTING UNAUTHORIZED ACCESS TO NON-VOLATILE MEMORY (NVM) SUBSYSTEM NAMESPACES

(71) Applicant: DELL PRODUCTS L.P., Round Rock, TX (US)

(72) Inventors: Erik Smith, Douglas, MA (US); David Black, Acton, MA (US); Ramprasad Shetty, Southborough, MA (US); Marina Shem Tov, Hod Hasharon (IL)

(73) Assignee: DELL PRODUCTS L.P., Round Rock, TX (US)

( * ) Notice: Subject to any disclaimer, the term of this patent is extended or adjusted under 35 U.S.C. 154(b) by 460 days.

(21) Appl. No.: 17/099,374

(22) Filed: Nov. 16, 2020

(65) Prior Publication Data
US 2022/0155965 A1 May 19, 2022

(51) Int. Cl.
G06F 3/06 (2006.01)

(52) U.S. Cl.
CPC ............ *G06F 3/067* (2013.01); *G06F 3/0611* (2013.01); *G06F 3/0613* (2013.01); *G06F 3/0659* (2013.01); *G06F 3/0688* (2013.01); G06F 2213/0026 (2013.01)

(58) Field of Classification Search
CPC ...... G06F 3/067; G06F 3/0611; G06F 3/0613; G06F 3/0659; G06F 3/0688; G06F 3/0637; G06F 3/0679; G06F 3/0622; G06F 2213/0026
See application file for complete search history.

(56) References Cited

U.S. PATENT DOCUMENTS

| 11,079,939 B1 * | 8/2021 | Puttagunta .......... G06F 13/4022 |
| 2019/0215341 A1 * | 7/2019 | Bharadwaj ............ H04L 49/357 |
| 2021/0314279 A1 * | 10/2021 | Tummala .............. H04L 49/357 |

* cited by examiner

*Primary Examiner* — Kalpit Parikh
(74) *Attorney, Agent, or Firm* — NORTH WEBER & BAUGH LLP

(57) ABSTRACT

In the case of FC-NVMe (NVMe over Fabrics using Fibre Channel (FC) as a transport), zoning is typically performed using the interface WWPNs, but the masking of NVMe namespaces is performed using a host's NVMe Qualified Name (NQN or HOSTNQN). The use of two identifiers (i.e., one identifier used for zoning and another identifier used for masking) introduces a potential security related concern. A bad actor may obtain the NQN of a host that has access to sensitive information and use it to access this sensitive information. Accordingly, in one or more embodiments, by correlating different identifiers and using a combination of the different identifiers, access can easily be provided to the appropriate host adapters while prohibiting access to rogue hosts.

20 Claims, 10 Drawing Sheets

PREVENTING UNAUTHORIZED ACCESS TO NON-VOLATILE MEMORY (NVM) SUBSYSTEM NAMESPACES

BACKGROUND

The present disclosure relates generally to information handling system. More particularly, the present disclosure relates to preventing unauthorized access to Non-Volatile Memory Express (NVM) subsystem storage.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use, such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Fibre Channel (FC) storage area network (SAN) administrators primarily use the World Wide Port Name (WWPN) of the host and storage interfaces to perform FC SAN zoning and logical unit number (LUN) masking. With the introduction of FC-NVMe (NVMe over Fabrics using FC as a transport), zoning is typically still performed using the interface WWPNs, but the masking of NVMe namespaces is performed using the host's NVMe Qualified Name (NQN). One of the reasons why the masking of NVMe namespaces uses NQN as the identifier is because each host may make use of multiple NQNs to access different groups of namespaces. As a result, if the WWPN of the FC interfaces on the host are used, masking would not function properly. Specifically, every NQN defined on the host would get access to all namespaces that have been allocated to the host interface WWPN, which may result in improper access to data.

Accordingly, it is highly desirable to find new and better ways for providing access to NVM subsystem namespaces while preventing unauthorized access.

BRIEF DESCRIPTION OF THE DRAWINGS

References will be made to embodiments of the disclosure, examples of which may be illustrated in the accompanying figures. These figures are intended to be illustrative, not limiting. Although the accompanying disclosure is generally described in the context of these embodiments, it should be understood that it is not intended to limit the scope of the disclosure to these particular embodiments. Items in the figures may not be to scale.

DETAILED DESCRIPTION OF EMBODIMENTS

Figure 1:
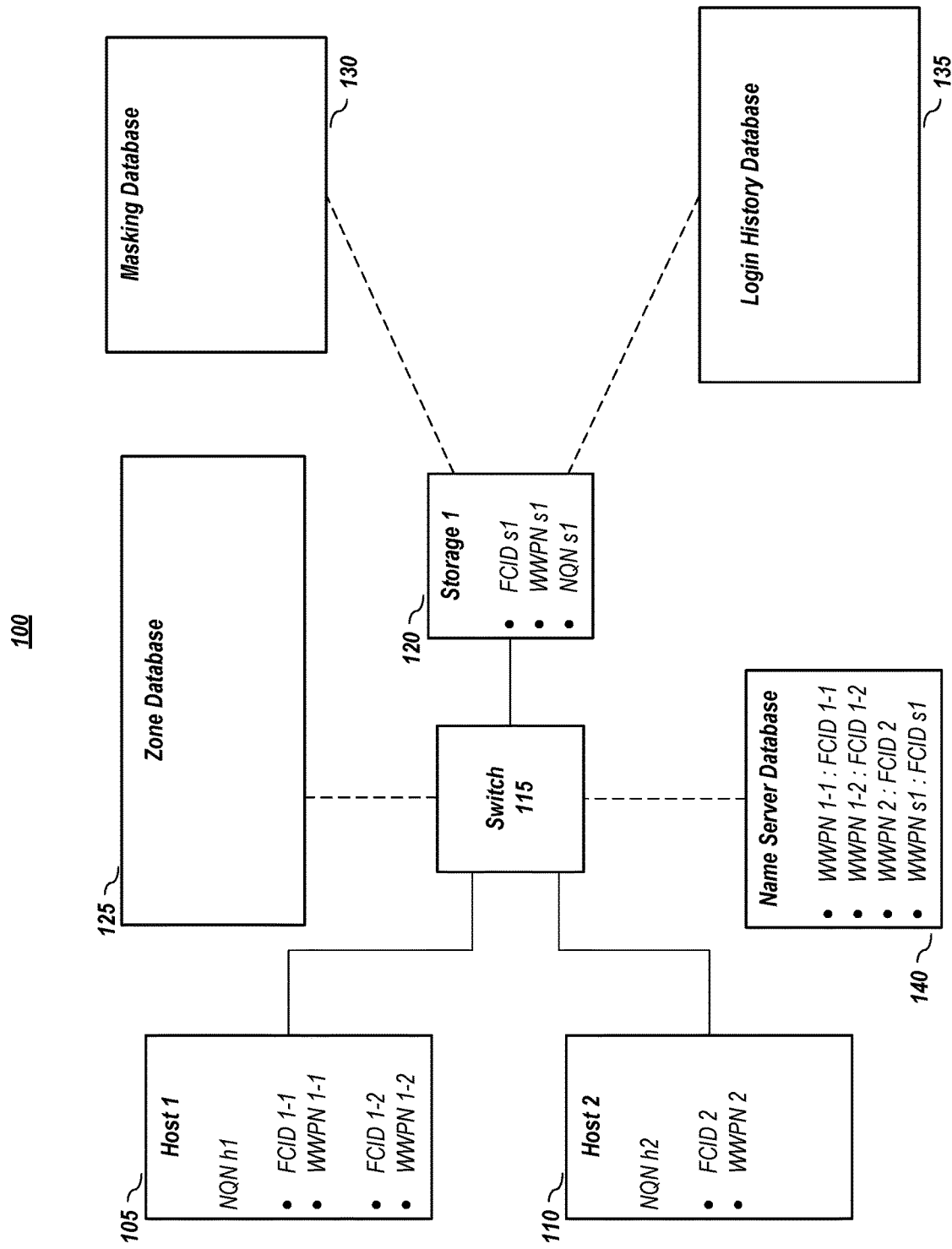
FIG. 1 ("FIG. 1") depicts an example system, according to embodiments of the present disclosure.

In the following description, for purposes of explanation, specific details are set forth in order to provide an understanding of the disclosure. It will be apparent, however, to one skilled in the art that the disclosure can be practiced without these details. Furthermore, one skilled in the art will recognize that embodiments of the present disclosure, described below, may be implemented in a variety of ways, such as a process, an apparatus, a system/device, or a method on a tangible computer-readable medium.

Components, or modules, shown in diagrams are illustrative of exemplary embodiments of the disclosure and are meant to avoid obscuring the disclosure. It shall also be understood that throughout this discussion that components may be described as separate functional units, which may comprise sub-units, but those skilled in the art will recognize that various components, or portions thereof, may be divided into separate components or may be integrated together, including, for example, being in a single system or component. It should be noted that functions or operations discussed herein may be implemented as components. Components may be implemented in software, hardware, or a combination thereof.

Furthermore, connections between components or systems within the figures are not intended to be limited to direct connections. Rather, data between these components may be modified, re-formatted, or otherwise changed by intermediary components. Also, additional or fewer connections may be used. It shall also be noted that the terms "coupled," "connected," "communicatively coupled," "interfacing," "interface," or any of their derivatives shall be understood to include direct connections, indirect connections through one or more intermediary devices, and wireless connections. It shall also be noted that any communication, such as a signal, response, reply, acknowledgement, message, query, etc., may comprise one or more sending, receiving, or exchanges of information.

Reference in the specification to "one or more embodiments," "preferred embodiment," "an embodiment," "embodiments," or the like means that a particular feature, structure, characteristic, or function described in connection with the embodiment is included in at least one embodiment of the disclosure and may be in more than one embodiment. Also, the appearances of the above-noted phrases in various places in the specification are not necessarily all referring to the same embodiment or embodiments.

The use of certain terms in various places in the specification is for illustration and should not be construed as limiting. The terms "include," "including," "comprise," and "comprising" shall be understood to be open terms, and any examples are provided by way of illustration and shall not be used to limit the scope of this disclosure.

A service, function, or resource is not limited to a single service, function, or resource; usage of these terms may refer to a grouping of related services, functions, or resources, which may be distributed or aggregated. The use of memory, database, information base, data store, tables, hardware, cache, and the like may be used herein to refer to system component or components into which information may be entered or otherwise recorded. The terms "data," "information," along with similar terms, may be replaced by other terminologies referring to a group of one or more bits, and may be used interchangeably. The terms "packet" or "frame" shall be understood to mean a group of one or more bits. The term "frame" shall not be interpreted as limiting embodiments of the present invention to Layer 2 networks; and, the term "packet" shall not be interpreted as limiting embodiments of the present invention to Layer 3 networks. The terms "packet," "frame," "data," or "data traffic" may be replaced by other terminologies referring to a group of bits, such as "datagram" or "cell." The words "optimal," "optimize," "optimization," and the like refer to an improvement of an outcome or a process and do not require that the specified outcome or process has achieved an "optimal" or peak state.

It shall be noted that: (1) certain steps may optionally be performed; (2) steps may not be limited to the specific order set forth herein; (3) certain steps may be performed in different orders; and (4) certain steps may be done concurrently.

Any headings used herein are for organizational purposes only and shall not be used to limit the scope of the description or the claims. Each reference/document mentioned in this patent document is incorporated by reference herein in its entirety.

A. General Introduction

As noted previously, FC SAN administrators use the World Wide Port Name (WWPN) of host and storage interfaces to perform FC SAN zoning and LUN masking. In the case of FC-NVMe (NVMe over Fabrics using FC as a transport), zoning is typically still performed using the interface WWPNs, but the masking of NVMe namespaces is performed using a host's NVMe Qualified Name (NQN or HOSTNQN). One of the reasons that NQN is used for masking is to prevent unauthorized access to storage. For example, a host may use multiple NQNs to access different groups of namespaces. If a system only used the WWPN(s) of the FC interfaces on the host, masking would not function properly because every NQN defined on the host could get access to all namespaces that have been allocated to the host interface WWPN.

Furthermore, the use of two identifiers (i.e., one identifier used for zoning and another identifier used for masking) introduces a potential security-related concern. A bad actor could obtain the NQN of a host that has access to sensitive information and use it to access this sensitive information from any host in the environment that is zoned to the subsystem. This problem is of critical importance to solve because this type of unauthorized access cannot be detected at the FC layer and effectively provides an opportunity to bypass hard zoning enforcement and duplicate WWPN detection. Both of these features prevent a similar class of issue in FC SANs today (i.e., WWPN spoofing) and are a standard feature on the majority of FC switching products.

Although NVMe authentication may be used to prevent this type of unauthorized access, support for it is nascent. And, more importantly, FC SAN administrators typically do not currently configure authentication and do not want the additional administrative burden of doing so. Various embodiments provide solutions to these issues. It shall be noted that the embodiments presented herein include example identifiers, names, formats, etc.; these are provided to help facilitate explaining embodiments. Other identifiers, names, formats, etc. may be used.

B. Embodiments for Granting Access—While Preventing Unauthorized Access—To Non-Volatile Memory (NVM) Subsystem Namespaces In the following subsections, embodiments of two different modes of operation are first introduced—learning and running. Then, embodiments of an NVMe namespace masking mechanism that performs access control using a WWPN+HOSTNQN (or NQN) identifier pair are presented. It shall be noted that these features may be used independently or in combination.

1. Learning Mode Embodiments

As described in the introduction section, a namespace access control mechanism that only takes into consideration a host's NQN does not provide adequate protection from a bad actor that may try to obtain unauthorized access to information. By using the WWPN (or its runtime proxy FCID) and NQN pair, one can ensure hosts only access their authorized namespaces, if any. In one or more embodiments, the FCID is contained in each frame and may be used to determine if access to a namespace should be granted or not. The FCID may be considered as a runtime nickname or proxy for a WWPN because there is a one-to-one relationship between them. Embodiments of the present disclosure allow for the relationship between a WWPN and the FCID that has been assigned and the NQN that they are associated with to be used for granting access to a namespace. By learning this association, embodiments ensure only the FCID associated with a WWPN that is associated with the correct NQN access the namespace.

It should also be noted that through a learning mechanism, WWPN and HOSTNQN pairs can be collected and presented to an administrator; thus, the administrator does not need to perform additional or configuration steps nor keep track of the WWPN and NQN pairs via some external means, such as spreadsheets.

In one or more embodiments, a storage administrator can place one or more storage subsystem interfaces into a "Learning" mode. As will be explained in more detail below, while operating in this state, the subsystem allows a Create Association (CASS) NVMe_LS request to complete successfully and grants access to namespaces allocated to the HOSTNQN in the Create Association (CASS) NVMe_LS request.

If the Create Association (CASS) was received from a FC identifier (FCID) that is associated with a WWPN that was explicitly paired with the HOSTNQN (e.g., via an administrative configuration), no additional action is required. In one or more embodiments, if the connect command contains a HOSTNQN that is either not paired with a WWPN or paired with a different WWPN, the subsystem may learn this pairing (i.e., retain the WWPN+NQN association).

Figure 2A:
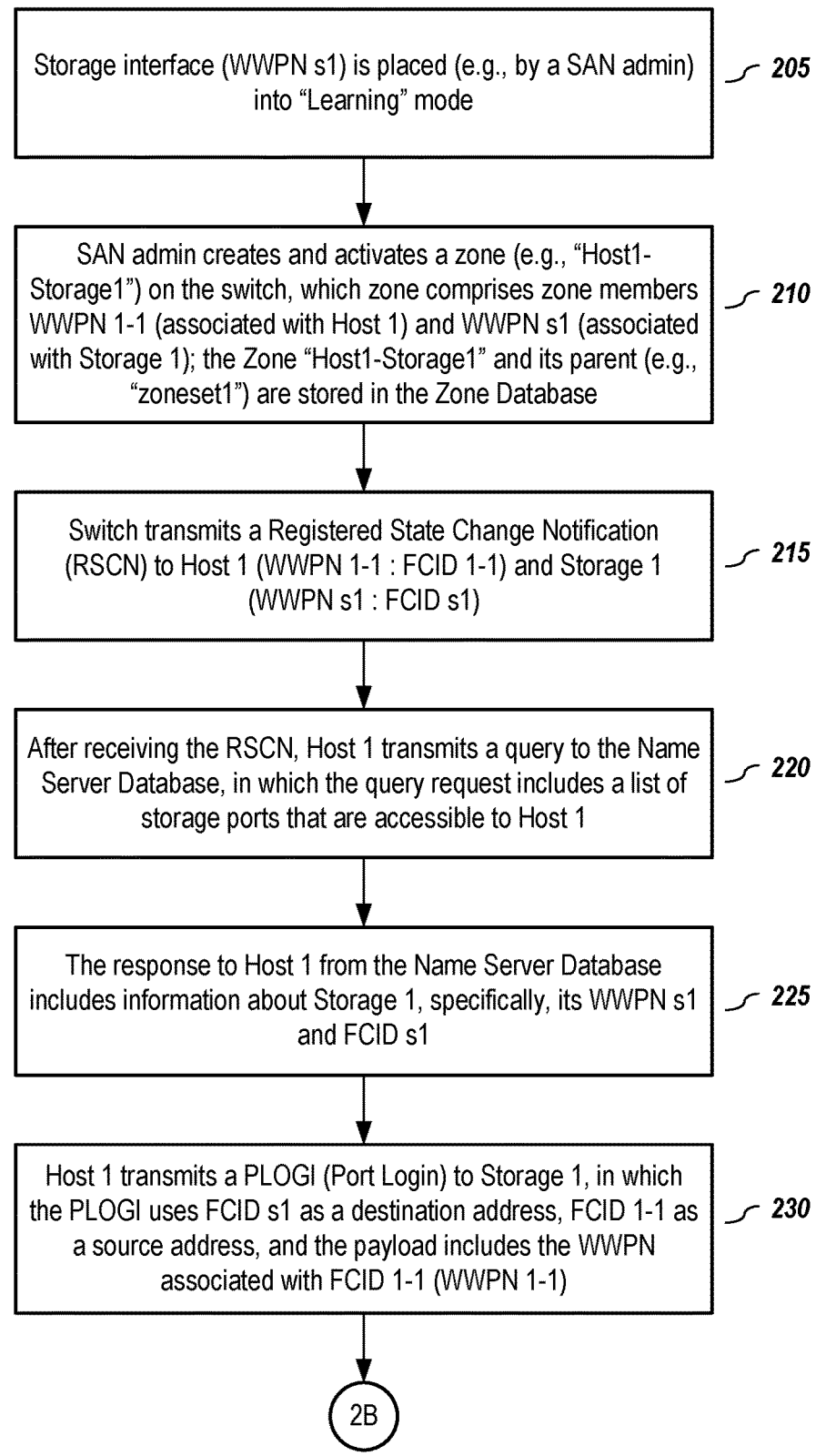
FIGS. 2A and 2B depict a method for learning identifier associations, according to embodiments of the present disclosure.
Figure 2B:
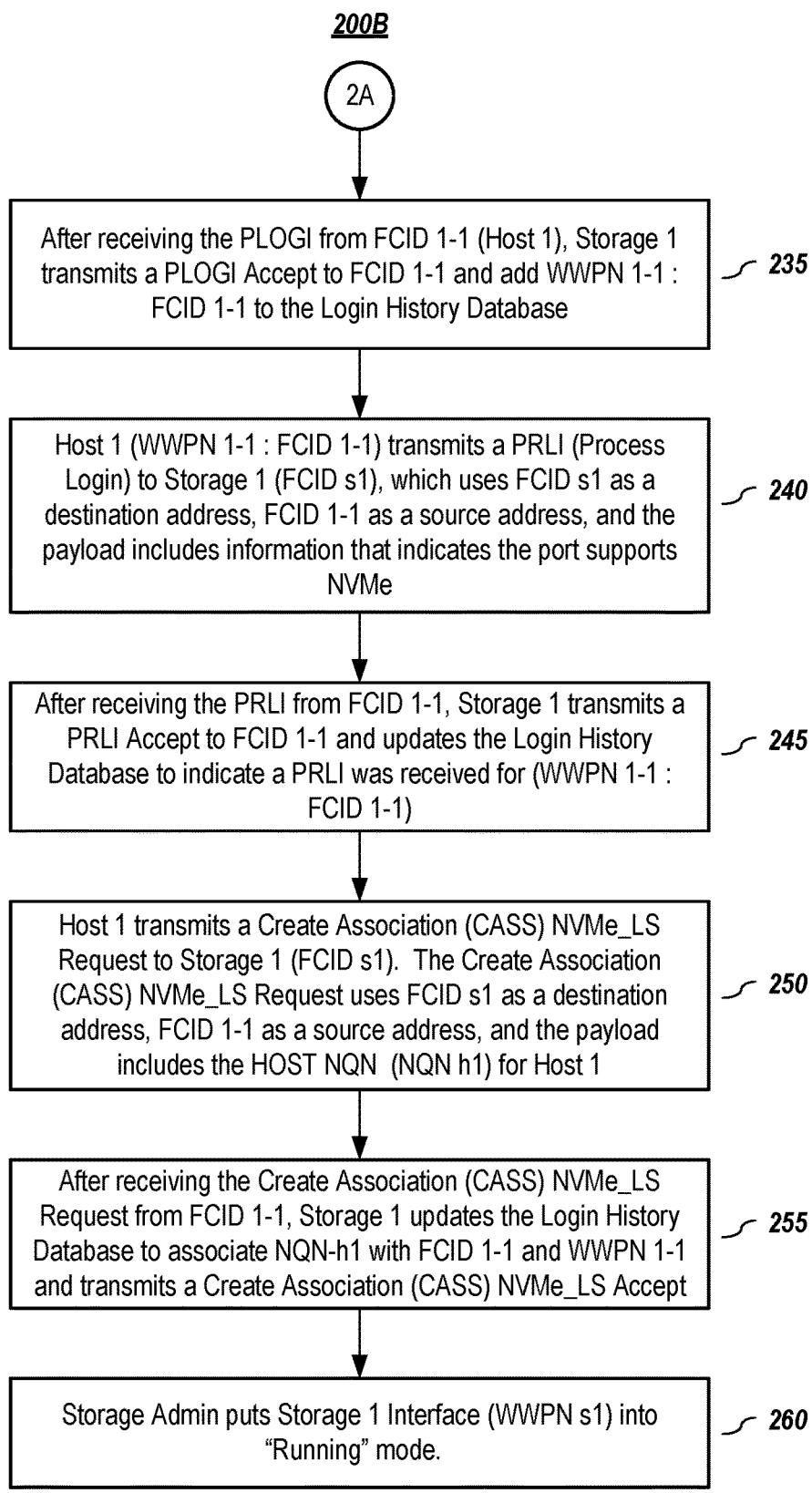

FIGS. 2A&B depict a learning methodology, according to embodiments of the present disclosure. FIG. 1 depicts an example system 100 to help facilitate the depicted methodology of FIGS. 2A&B. For sake of illustration, it is assumed that Storage 1 120, Host 1 105 and Host 2 110 are all logged into the switch 115 and their FCIDs and WWPNs are all stored in a name server database 140. Note that Host 1 105 has two FCIDs and WWPNs; thus, as illustrated in FIG. 1, there are four (4) entries in the name server database 140:

WWPN 1-1: FCID 1-1
WWPN 1-2: FCID 1-2
WWPN 2: FCID 2
WWPN s1: FCID s1

Also note that at this stage in this depicted example: (a) there are no zones or zone sets stored in the zone database 125; (b) there are no masking entries in the masking database 130; (c) there are no login entries in the login history database 135.

Figure 3:
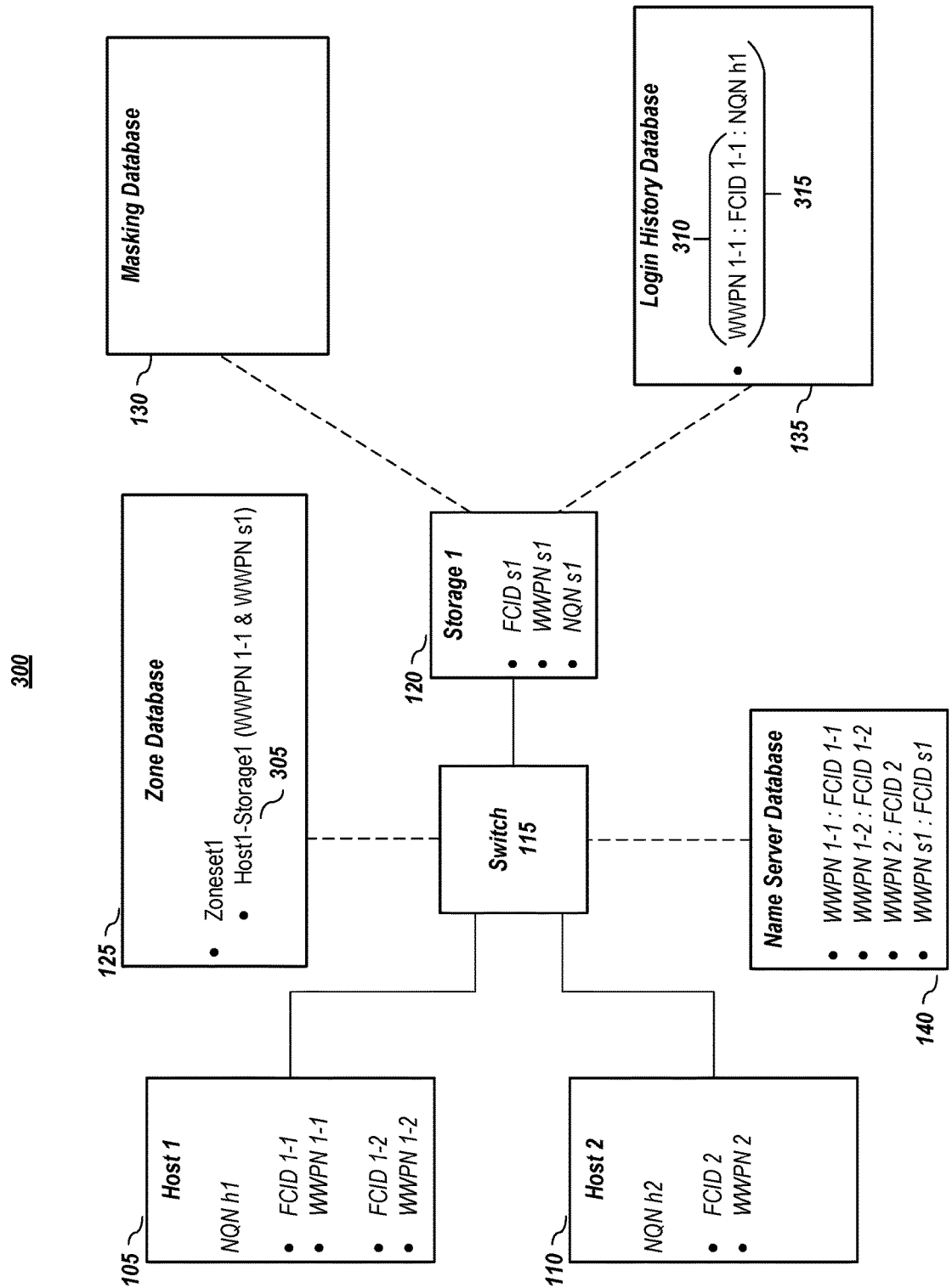
FIG. 3 depicts an update to the example system following a learning process, according to embodiments of the present disclosure.

Returning to FIG. 2A, in one or more embodiments, an interface of the Storage 120 (i.e., WWPN s1) is placed (205) into a "learning" mode. For example, a storage/SAN administrator may place the storage interface into learning mode. In one or more embodiments, the SAN admin creates and activates (210) a zone set (e.g., "zoneset1") that contains a zone (e.g., "Host1-Storage1") on the switch 115, which zone comprises zone members WWPN 1-1 (associated with Host 1) and WWPN s1 (associated with Storage 1). In one or more embodiments, the zone "Host1-Storage1" is stored in the zone database 125, which may also include a parent zone set entry. FIG. 3 depicts the network in FIG. 1 in which the zone entry 305 has been entered into the zone database 125, according to embodiments of the present disclosure.

In one or more embodiments, the switch 115 transmits (215) a Registered State Change Notification (RSCN) to Host 1 (WWPN 1-1: FCID 1-1) and to Storage 1 (WWPN s1: FCID s1). After receiving the RSCN, Host 1 (WWPN 1-1: FCID 1-1) transmits a query to the name server database 140 requesting a list of storage ports that are accessible to Host 1 105 (WWPN 1-1: FCID 1-1). It should be noted that neither Host 1's other interface (i.e., WWPN 1-2: FCID 1-2) nor Host 2 110 (WWPN 2: FCID 2) receive an RSCN because they were not affected by the zoning change.

In one or more embodiments, the response to Host 1 (WWPN 1-1: FCID 1-1) from the name server database 140 includes (225) information about Storage 1 120—specifically, Storage 1's WWPN and FCID (WWPN s1: FCID s1).

Given the storage information, Host 1 (WWPN 1-1: FCID 1-1) transmits (230) a PLOGI (Port Login) to Storage 1 120 (FCID s1). The PLOGI uses FCID s1 as a destination address, FCID 1-1 as a source address, and the payload includes the WWPN associated with FCID 1-1, namely WWPN 1-1. Upon reception of the PLOGI from Host 1 (using the identifier FCID 1-1), Storage 1 transmits (235) a PLOGI Accept to FCID 1-1 and has the entry WWPN 1-1: FCID 1-1 included in the login history database 135. FIG. 3 depicts the entry, WWPN 1-1: FCID 1-1 310, in the login history database 135.

In one or more embodiments, Host 1 (WWPN 1-1: FCID 1-1) transmits (240) a PRLI (Process Login) to Storage 1 (FCID s1). In this example, the PRLI uses FCID s1 as a destination address, FCID 1-1 as a source address, and the payload may also include information that indicates that the port supports NVMe.

In one or more embodiments, after receipt of the PRLI from FCID 1-1, Storage 1 transmits (245) a PRLI Accept to FCID 1-1 and may also update the login history database 135 to indicate a PRLI was received for WWPN 1-1: FCID 1-1.

In one or more embodiments, Host 1 105 transmits (250) a Create Association (CASS) NVMe_LS request to Storage 1 120 (FCID s1). In this example, the Create Association (CASS) NVMe_LS request uses FCID s1 as a destination address, FCID 1-1 as a source address, and the payload includes the HOSTNQN for Host 1-105 (NQN h1).

In one or more embodiments, upon receiving the Create Association (CASS) NVMe_LS request from FCID 1-1, Storage 1 120 updates (255) the login history database 135 to associate NQN-h1 with FCID 1-1 and WWPN 1-1, which update 315 is depicted in FIG. 3, and transmits (255) a Create Association (CASS) NVMe_LS accept.

This example embodiment illustrates how WWPN, FCID, and NQN are associated and recorded. It should be noted that this process may be repeated for other devices (e.g., Host 2 110) or other interfaces (e.g., FCID 1-2: WWPN 1-2 on Host 1). In one or more embodiments, once the learning process has been completed, the SAN admin may put the storage (e.g., Storage 1 interface (WWPN s1)) into "Running" mode. Embodiments of running mode are presented below.

It shall be noted that, in one or more embodiments, one or more entries may be explicitly added to the login history database 135. For example, rather than obtaining entry values via a learning process, an administrator may directly create one or more entries.

2. Running Mode Embodiments Overview

In one or more embodiments, a storage/SAN administrator may place one or more subsystem interfaces into a "Running" mode. While operating in this state, the subsystem may receive Create Association (CASS) NVMe_LS requests from one or more hosts and may grant a host access to the namespaces allocated to the host's NQN in the Create Association (CASS) NVMe_LS request, if the Create Association (CASS) NVMe_LS request was received from an FCID that is associated with a WWPN that was paired with the NQN. Note that this pairing may be done explicitly (e.g., via an administrative configuration) or may have been learned during a learning mode operation, such as discussed in the prior section. In one or more embodiments, if there is not a masking rule for the WWPN-NQN pair, the storage will not grant access. It should be noted that, as mentioned above, the FCID is a runtime representation of a particular WWPN. Thus, references to WWPN-NQN pairs may include FCID because while access is granted to a WWPN+NQN pair, it may actually be enforced or implemented using the FCID (since the WWPN may not be present in each frame but the FCID typically is.

3. Running Mode—No Identifier Pair-Based Masking Embodiments

Figure 4:
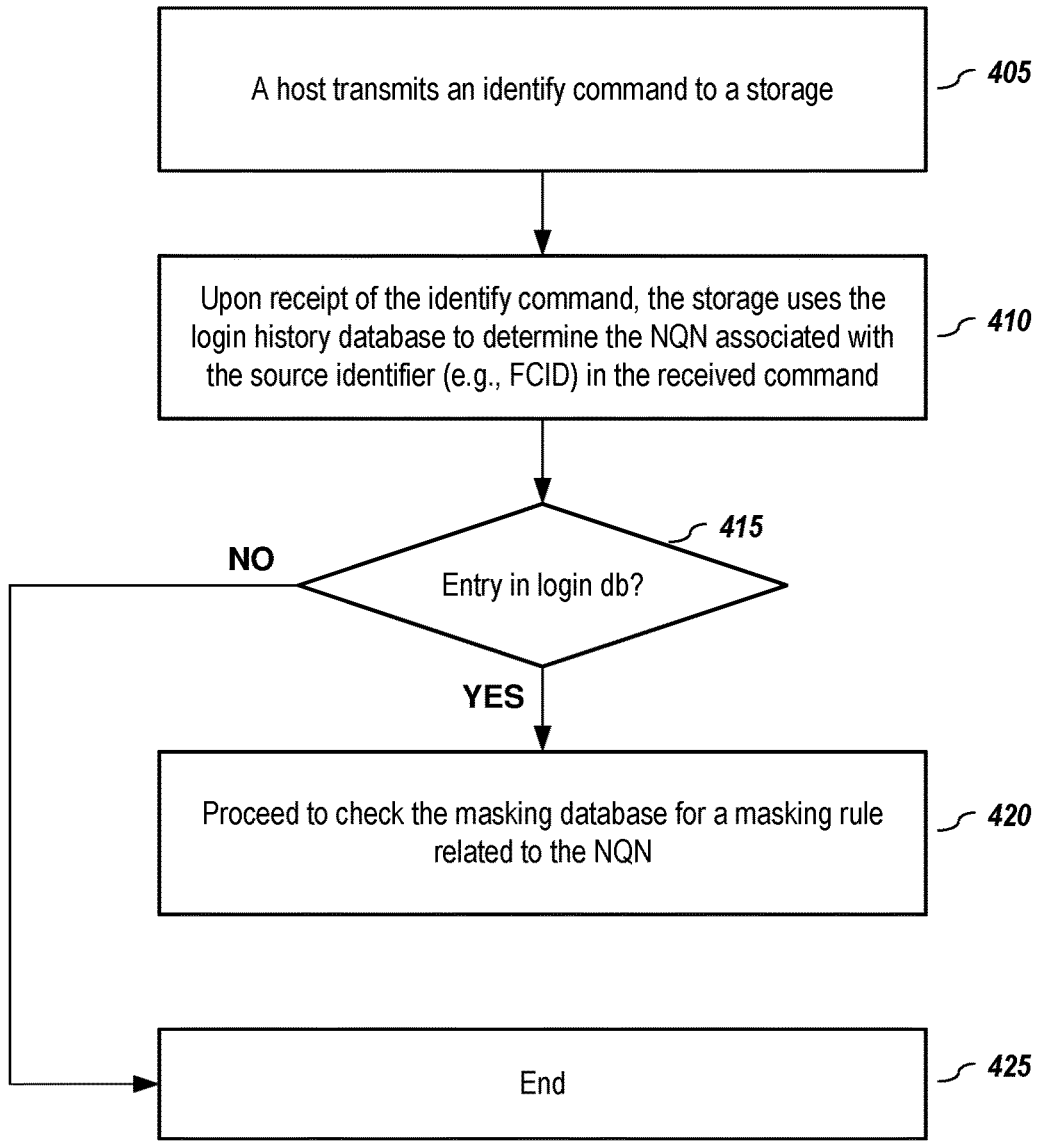
FIG. 4 depicts a running mode operation, according to embodiments of the present disclosure.

FIG. 4 depicts a running mode operation, according to embodiments of the present disclosure. For sake of illustration, assume that the starting point is that of the system 300 in FIG. 3 where the learning process embodiment example ended. That is, there are the four (4) entries in the name server database 140, as shown in FIG. 3;

there is one zone set "zoneset1" comprising one zone "Host1-Storage1" as stored in the zone database 125, and the zoneset1 has been activated on the switch 115;
the login history database 135 contains one entry (i.e., WWPN 1-1: FCID 1-1: NQN-h1);
the host interface associated with the entry in the login history database has completed PLOGI and PRLI and has indicated that it supports NVMe; and
there are no masking entries in the masking database 130.

In one or more embodiments, Host 1 105 transmits (405) an "Identify (CNS 02h)" command to Storage 1 120. In this example, the Destination FCID (D_ID) is FCID s1 and the Source FCID (S_ID) is FCID 1-1.

Upon receiving the "Identify (CNS 02h)" command, Storage 1 notes the S_ID (i.e., FCID 1-1) and consults (410) the login history database 135 to determine what NQN is associated with that FCID. In this example, the entry in the login history database indicates that FCID 1-1 is associated with NQN h1. In one or more embodiments, Storage 1 120 consults (the masking database 130 for a masking rule related to allowing access to a namespace. In this example, there are no namespaces masked to NQN h1. As a result, a response to the "Identify (CNS 02h)" communication may be a zero-length namespace list—indicating that the host interface has access to no namespaces.

If, when Storage 1 120 consults (410) the login history database 135 and finds (415) no entry, the process may end (425) because there is no correlation between the WWPN/FCID and the NQN.

4. Running Mode—Identifier Pair-Based Masking Embodiments

Figure 5:
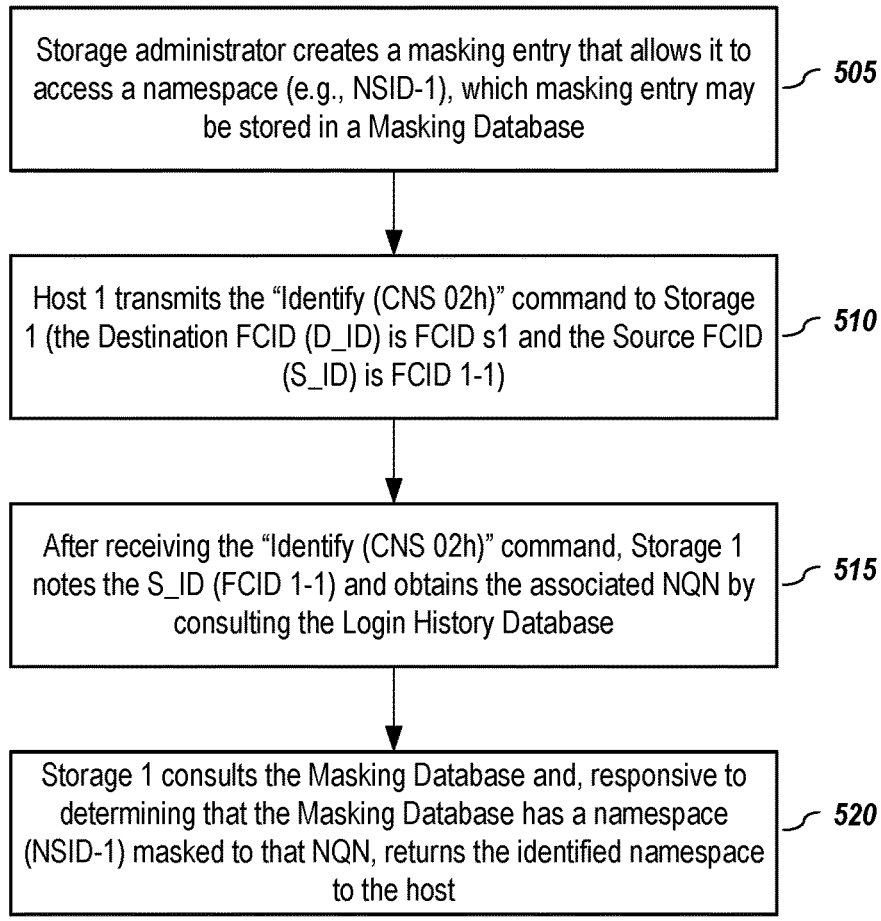
FIG. 5 depicts an alternative running mode operation, according to embodiments of the present disclosure.

FIG. 5 depicts an alternative running mode operation, according to embodiments of the present disclosure. For sake of illustration, assume that the starting point is that of the system 300 in FIG. 3. As illustrated in FIG. 3, the following configurations exist, which may exist following a learning operation:
there are the four (4) entries in the name server database 140:
 1. WWPN 1-1: FCID 1-1
 2. WWPN 1-2: FCID 1-2
 3. WWPN 2: FCID 2
 4. WWPN s1: FCID s1
there is one zone set "zoneset1" comprising one zone "Host1-Storage1" as stored in the zone database 125, and the zoneset1 has been activated on the switch 115;
the login history database 135 contains one entry:
 1. WWPN 1-1: FCID 1-1: NQN-h1);
the host interface associated with the entry in the login history database has completed PLOGI and PRLI and has indicated that it supports NVMe; and
there are not yet any masking entries in the masking database 130.

Figure 6:
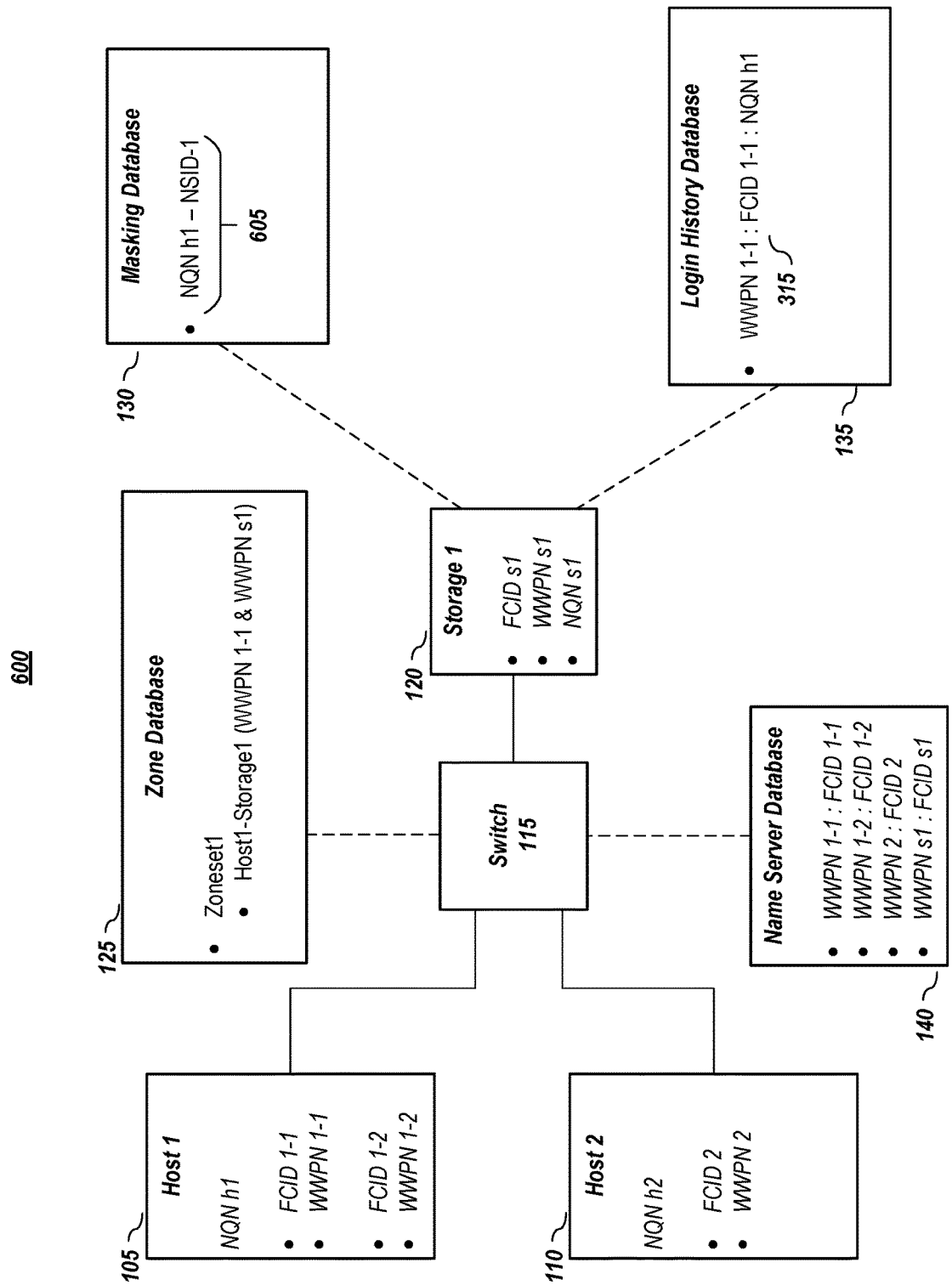
FIG. 6 depicts an updated system of FIG. 3, according to embodiments of the present disclosure.

Turning to FIG. 5, in one or more embodiments, a storage/SAN administrator creates (505) a masking entry that allows it to access a namespace. For example, in one or more embodiments, the administrator may open a storage provisioning user interface (UI), select the entry "NQN-h1," which may be retrieved from the login history database 135, and creates a masking entry that allows the adapter associated with NQN-h1 to access a namespace (NSID-1). The masking entry allowing "NQN-h1" to access namespace NSID-1 may be stored in a masking database 130. FIG. 6 show the system of FIG. 3, which has been updated to reflect the masking rule entry 605 in the masking database 130, according to embodiments of the present disclosure.

Returning to FIG. 5, by way of illustration, Host 1 105 transmits (510) an "Identify (CNS 02h)" command, which may be used to get the namespace list, to Storage 1 120. In this example, the Destination FCID (D_ID) is FCID s1 and the Source FCID (S_ID) is FCID 1-1. In one or more embodiments, after receiving the "Identify (CNS 02h)" command, Storage 120 notes the S_ID (i.e., FCID 1-1) and consults the login history database 135 to determine that the FCID 1-1 is associated with an NQN (i.e., NQN h1).

In one or more embodiments, Storage 1 consults the masking database 130. And, responsive to determining that the masking database has an entry 605 with that NQN masked to a namespace, the storage 120 may return the identified namespace to the host. In one or more embodiments, the storage may return the identified namespace in a namespace list in a response.

Figure 7:
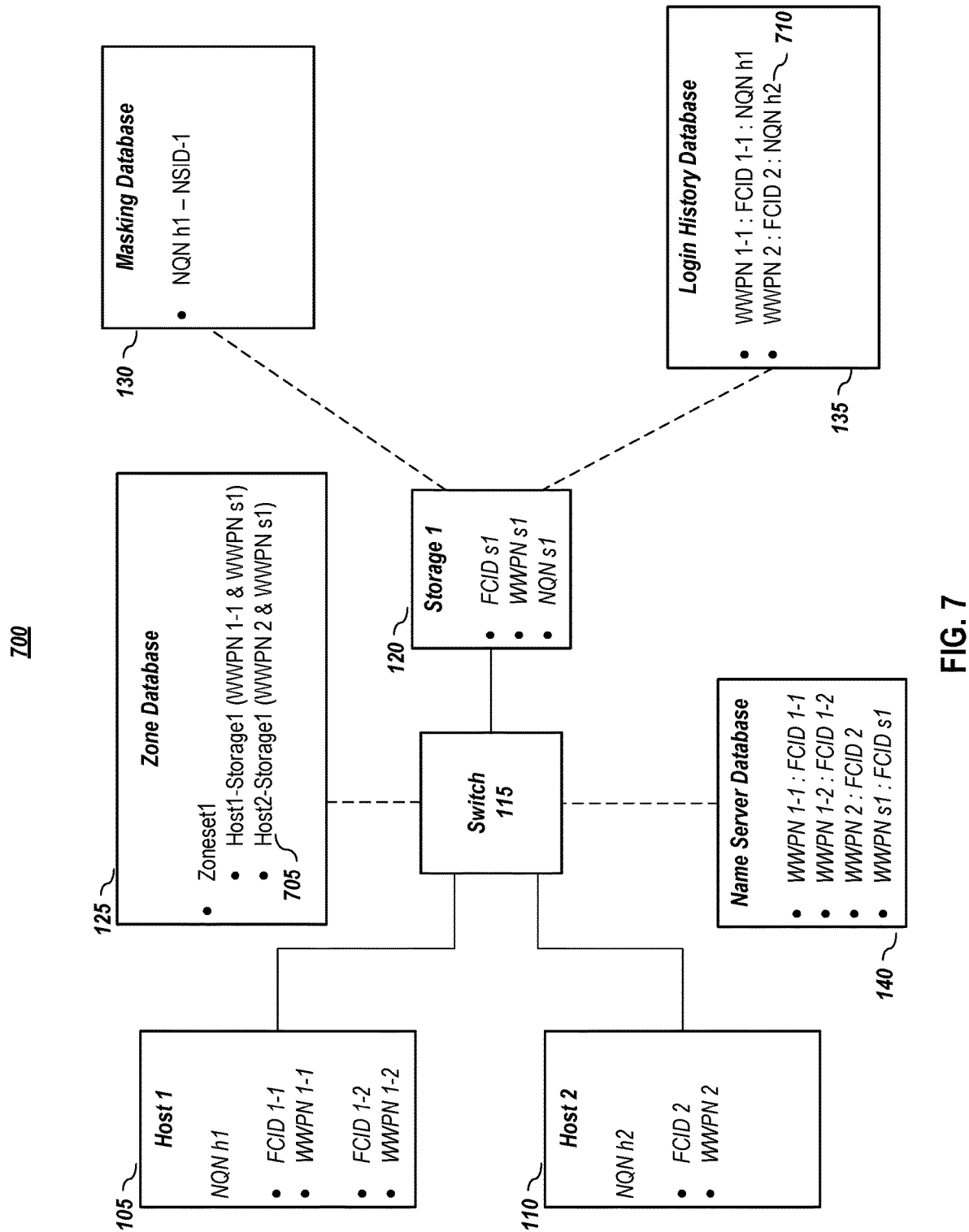
FIG. 7 shows an updated system of FIG. 6, according to embodiments of the present disclosure.

It shall be noted that using a combination of identifiers—FCID/WWPN and NQN—the process of masking is made easier and stops a rogue host from impersonating another host to gain improper access to a storage namespace. Consider, by way of illustration, the system configuration that starts with the configuration of FIG. 6, in which the masking has completed and the storage 1 is still operating in running mode. In this example, a SAN admin creates a zone "Host2-Storage1" on the switch 115 comprising zone members WWPN 2 (associated with host 2 110) and WWPN s1 (associated with storage 1 120). The zone, "Host2-Storage1," and its parent zone set entry, "zoneset1," are stored in the zone database 125. FIG. 7 shows the system of FIG. 6, which has been updated to reflect the newly created "Host2-Storage1" zone entry 705 in the zone database 125. Assume also that the SAN admin has activated "zoneset1" on the switch 115.

In one or more embodiments, the switch 115 transmits a Registered State Change Notification (RSCN) to Host 2 110 (WWPN 2: FCID 2) and Storage 1-120 (WWPN s1: FCID s1). Upon reception of the RSCN, Host 2-110 (WWPN 2: FCID 2) transmits a query to the name server database 140. The query requests a list of storage ports that are accessible to Host 2 110 (WWPN 2: FCID 2).

In one or more embodiments, the response to the Host 2 110 (WWPN 2: FCID 2) from the name server database 140 includes information about Storage 1—specifically, WWPN s1: FCID s1. It should be noted that neither Host 1 (WWPN 1-1: FCID 1-1) nor Host 1 (WWPN 1-2: FCID 1-2) receives this RSCN because they were not impacted by the zoning change.

In one or more embodiments, Host 2 110 (WWPN 2: FCID 2) transmits a PLOGI to Storage 1 (FCID s1). The PLOGI uses FCID s1 as a destination address, FCID 2 as a source address, and the payload includes the WWPN associated with FCID 2 (WWPN 2). Upon reception of the PLOGI from FCID 2, Storage 1 120 transmits a PLOGI Accept to FCID 2 and adds (WWPN 2: FCID 2) to the login history database 135. FIG. 7 shows the added login entry 710.

In one or more embodiments, Host 2 110 (WWPN 2: FCID 2) transmits a PRLI to Storage 1 120 (FCID s1), in which the PRLI uses FCID s1 as a destination address, FCID 2 as a source address, and the payload may include information that indicates the port supports NVMe. Upon reception of the PRLI from FCID 2, Storage 1 transmits a PRLI Accept to FCID 2 and may update the login history database 135 to indicate a PRLI was received for WWPN 2: FCID 2.

To this point, the process has been the same as illustrated above with respect Host 1 (WWPN 1-1: FCID 1-1) when it was granted access to its namespace. However, to illustrate how embodiments help prevent devices from improperly accessing storage, consider the following. In one or more embodiments, Host 2 110 transmits a Create Association (CASS) NVMe_LS request to Storage 1 120 (FCID s1), in which the Create Association (CASS) NVMe_LS request uses FCID s1 as a destination address, FCID 2 as a source address, and the payload includes the HOSTNQN for Host 1 105 (NQN h1). Note that Host 2 110 should NOT be using this NQN as it belongs to Host 1 105.

After receiving the Create Association (CASS) NVMe_LS request from FCID 2, Storage 1 120 transmits a Link Service (LS) reject in response to the Create Association (CASS) NVMe_LS request and will NOT update the login history database 135 to associate NQN-h1 with FCID 2 and WWPN 2. It should be noted that, in one or more embodiments, if Storage 1 were in learning mode, the Create Association (CASS) NVMe_LS request would have been accepted and the association would have been added to the login history database.

In one or more embodiments, if Host 2 110 transmits a Create Association (CASS) NVMe_LS request to Storage 1 120. The Destination FCID (D_ID) would be FCID s1 and the Source FCID (S_ID) is FCID 2. After receiving the Create Association (CASS) NVMe_LS request, Storage 1 120 notes the S_ID (FCID 2), consults the login history database 135, determines that FCID 2 is NOT associated with NQN h1 and transmits a Link Service (LS) reject in response to the Create Association (CASS) NVMe_LS request. In one or more embodiments, the absence of an FCID and NQN correlation may end the process.

In one or more embodiments, Storage 1 may consult the masking database 130. Given that there are no namespaces masked to the S_ID (FCID 2), the response will contain zero namespaces in the namespace list.

Thus, it can be seen that an inadvertent or deliberate attempt by a host to access a namespace by spoofing the NQN will not work in embodiments herein. It shall be noted that if there is a mismatch in NQN, the storage subsystem may alert the SAN admin. Having been alerted, the admin can correct the mismatch, if it is an error, or may monitor the host adapter as it appears to be a rogue device trying to improperly gain access.

C. Additional Embodiments

1. Additional Host WWPN, Host NQN, and Subsystem Interface WWPN-Based Masking Embodiments In one or more embodiments, the subsystem interface WWPN may also be included in the masking view to ensure that each host accesses namespaces only via a specific subsystem interface. Such embodiments would prevent an unauthorized access that utilizes both WWPN and HOSTNQN spoofing from gaining unauthorized access. WWPN spoofing may be possible when the WWPN being spoofed is used on a Fabric where that WWPN is not already in use. An example is a SAN A/SAN B environment where the actual WWPN is in use on SAN A and the bad actor spoofs the WWPN on SAN B. In one or more embodiments, this type of access is easily defeated with FC SAN zoning, but it is possible in environments where the SAN administrator uses the same zone set on both fabrics. Typically, hosts are attached to two SAN Fabrics (e.g., SAN A and SAN B). Each SAN contains a unique set of WWPNs (typically one per each host bus adapter (HBA)). Usually, when the SAN admin is creating zones, they will create two different zone sets (one for SAN A and the other for SAN B). However, sometimes a SAN admin may create a single zone set, which is incorrect procedure, containing zones that include both HBA WWPNs and the Storage ports they are allowed to access. With the zone set activated on both fabrics, an admin may have just exposed their networks to an undetectable WWPN spoofing attack because any host adapter in SAN A could assume the identity of a host adapter on SAN B and access storage resources that they should not otherwise be able to.

In one or more embodiments, a verification of WWPN/FCID and NQN may also be performed at other times and with different communications. It shall be noted that a Create Association (CASS) NVMe_LS request communication is but one type of communication that may be used to trigger a verification. For example, in one or more embodiments, a Fabrics Connect command may also be a communication that may be used to implement one or more of the embodiments presented herein to prohibit a rogue or improper NQN host adapter from accessing storage that it should not.

2. Applicability to Other Transport Types

It shall be noted that although embodiments described above were within the context of using Fibre Channel as a transport, aspects of the present disclosure are not so limited. Accordingly, the aspects of the present disclosure may be applied or adapted for use in other contexts, such as over an IP-based protocol (e.g., RoCE, iWARP, etc.). For example, in one or more embodiments, with IP-based fabrics, the IP address of the host may be used in place of the Host WWPN and/or FCID. With Fibre Channel, the FCID is used as a transport Address and the WWPN is used as the unique identifier. With IP both transport address and unique id are handled by the IP. In one or more embodiments, if the embodiment were an all-Layer 2 configuration, the unique ID would be considered to be the MAC.

3. Embodiments Aid Configuration

It shall be noted that additional benefits of embodiment of the present disclosure is the ability to aid an administrator to configure a system. Embodiment via the Login History database entries may be used to provide pre-populated picklist or dropdown menu of available host adapters from which an administrator may select when configuring an entry into the masking database. By allowing learning of the various identifiers so that pre-populated lists may be provided to the administrator, fewer errors are made in the system. For example, the identifiers can be complex names and/or numbers, which can be easily mis-entered. Supplying the identifiers (e.g., WWPNs and NQNs) via pre-populated list eliminates the risk for mis-entry.

D. System Embodiments

In one or more embodiments, aspects of the present patent document may be directed to, may include, or may be implemented on one or more information handling systems (or computing systems). An information handling system/computing system may include any instrumentality or aggregate of instrumentalities operable to compute, calculate, determine, classify, process, transmit, receive, retrieve, originate, route, switch, store, display, communicate, manifest, detect, record, reproduce, handle, or utilize any form of information, intelligence, or data. For example, a computing system may be or may include a personal computer (e.g., laptop), tablet computer, mobile device (e.g., personal digital assistant (PDA), smart phone, phablet, tablet, etc.), smart watch, server (e.g., blade server or rack server), a network storage device, camera, or any other suitable device and may vary in size, shape, performance, functionality, and price. The computing system may include random access memory (RAM), one or more processing resources such as a central processing unit (CPU) or hardware or software control logic, read only memory (ROM), and/or other types of memory. Additional components of the computing system may include one or more drives (e.g., hard disk drives, solid state drives, or both), one or more network ports for communicating with external devices as well as various input and output (I/O) devices, such as a keyboard, mouse, stylus, touchscreen, and/or video display. The computing system may also include one or more buses operable to transmit communications between the various hardware components.

Figure 8:
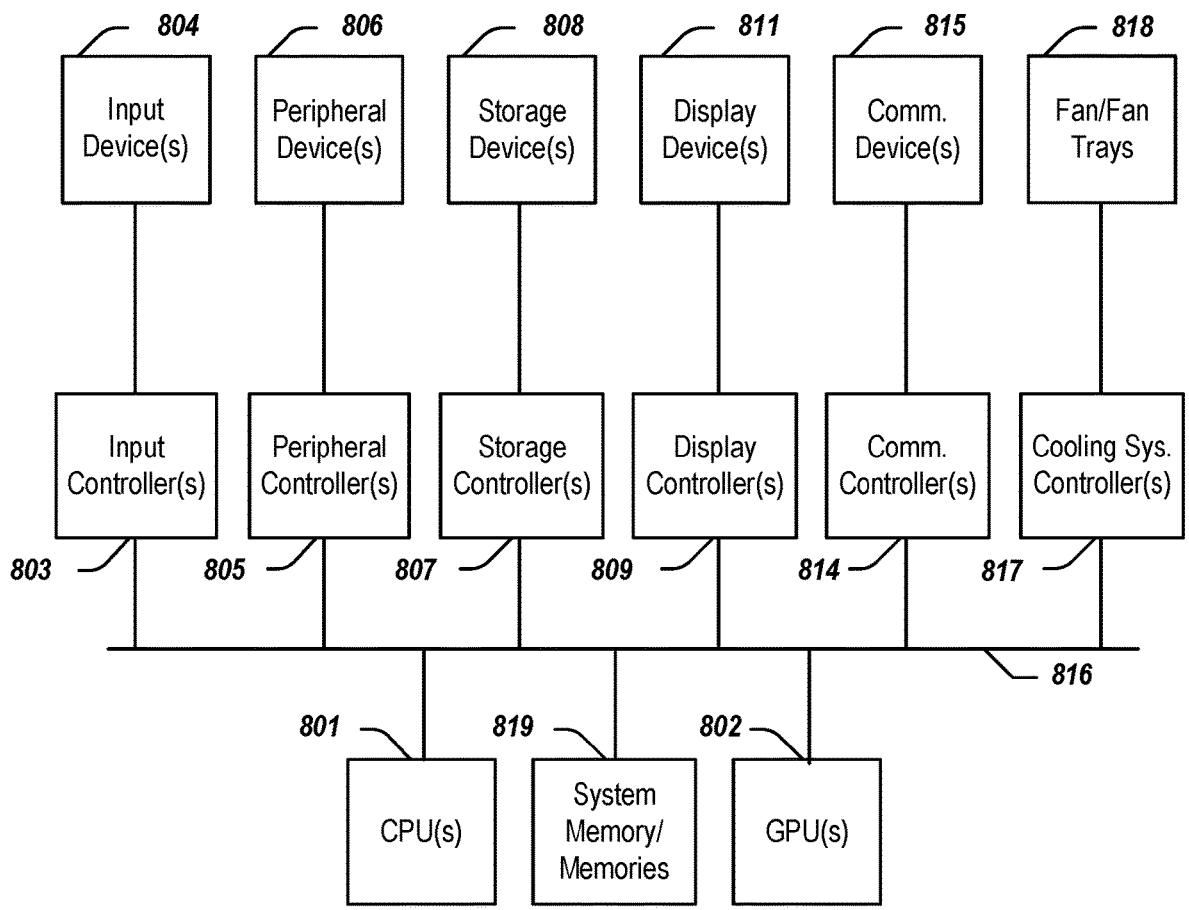
FIG. 8 depicts a simplified block diagram of an information handling system, according to embodiments of the present disclosure.

FIG. 8 depicts a simplified block diagram of an information handling system (or computing system), according to embodiments of the present disclosure. It will be understood that the functionalities shown for system 800 may operate to support various embodiments of a computing system—although it shall be understood that a computing system may be differently configured and include different components, including having fewer or more components as depicted in FIG. 8.

As illustrated in FIG. 8, the computing system 800 includes one or more central processing units (CPU) 801 that provides computing resources and controls the computer. CPU 801 may be implemented with a microprocessor or the like and may also include one or more graphics processing units (GPU) 802 and/or a floating-point coprocessor for mathematical computations. In one or more embodiments, one or more GPUs 802 may be incorporated within the display controller 809, such as part of a graphics card or cards. The system 800 may also include a system memory 819, which may comprise RAM, ROM, or both.

A number of controllers and peripheral devices may also be provided, as shown in FIG. 8. An input controller 803 represents an interface to various input device(s) 804, such as a keyboard, mouse, touchscreen, and/or stylus. The computing system 800 may also include a storage controller 807 for interfacing with one or more storage devices 808 each of which includes a storage medium such as magnetic tape or disk, or an optical medium that might be used to record programs of instructions for operating systems, utilities, and applications, which may include embodiments of programs that implement various aspects of the present disclosure. Storage device(s) 808 may also be used to store processed data or data to be processed in accordance with the disclosure. The system 800 may also include a display controller 809 for providing an interface to a display device 811, which may be a cathode ray tube (CRT) display, a thin film transistor (TFT) display, organic light-emitting diode, electroluminescent panel, plasma panel, or any other type of display. The computing system 800 may also include one or more peripheral controllers or interfaces 805 for one or more peripherals 806. Examples of peripherals may include one or more printers, scanners, input devices, output devices, sensors, and the like. A communications controller 814 may interface with one or more communication devices 815, which enables the system 800 to connect to remote devices through any of a variety of networks including the Internet, a cloud resource (e.g., an Ethernet cloud, a Fiber Channel over Ethernet (FCoE)/Data Center Bridging (DCB) cloud, etc.), a local area network (LAN), a wide area network (WAN), a storage area network (SAN) or through any suitable electromagnetic carrier signals including infrared signals. As shown in the depicted embodiment, the computing system 800 comprises one or more fans or fan trays 818 and a cooling subsystem controller or controllers 817 that monitors thermal temperature(s) of the system 800 (or components thereof) and operates the fans/fan trays 818 to help regulate the temperature.

In the illustrated system, all major system components may connect to a bus 816, which may represent more than one physical bus. However, various system components may or may not be in physical proximity to one another. For example, input data and/or output data may be remotely transmitted from one physical location to another. In addition, programs that implement various aspects of the disclosure may be accessed from a remote location (e.g., a server) over a network. Such data and/or programs may be conveyed through any of a variety of machine-readable medium including, for example: magnetic media such as hard disks, floppy disks, and magnetic tape; optical media such as compact discs (CDs) and holographic devices; magneto-optical media; and hardware devices that are specially configured to store or to store and execute program code, such as application specific integrated circuits (ASICs), programmable logic devices (PLDs), flash memory devices, other non-volatile memory (NVM) devices (such as 3D XPoint-based devices), and ROM and RAM devices.

Figure 9:
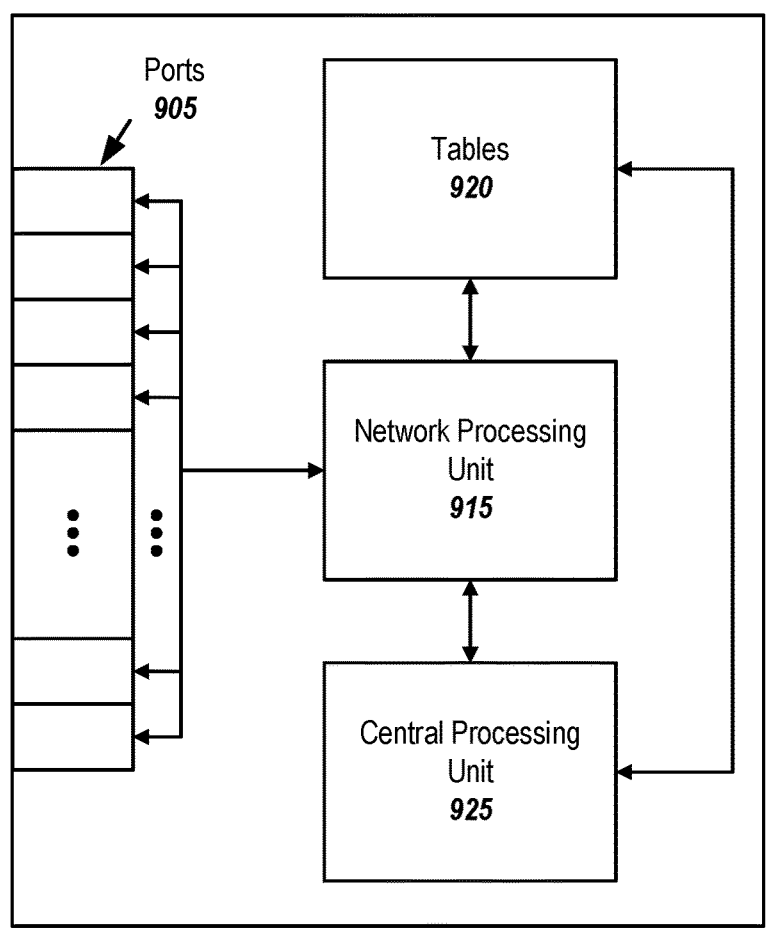
FIG. 9 depicts an alternative block diagram of an information handling system, according to embodiments of the present disclosure.

FIG. 9 depicts an alternative block diagram of an information handling system, according to embodiments of the present disclosure. It will be understood that the functionalities shown for system 900 may operate to support various embodiments of the present disclosure—although it shall be understood that such system may be differently configured and include different components, additional components, or fewer components.

The information handling system 900 may include a plurality of I/O ports 905, one or more network processing units (NPU) 915, one or more tables 920, and one or more central processing units (CPU) 925. The system includes a power supply (not shown) and may also include other components, which are not shown for sake of simplicity.

In one or more embodiments, the I/O ports 905 may be connected via one or more cables to one or more other network devices or clients. The network processing unit 915 may use information included in the network data received at the node 900, as well as information stored in the tables 920, to identify a next device for the network data, among other possible activities. In one or more embodiments, a switching fabric may then schedule the network data for propagation through the node to an egress port for transmission to the next destination.

Aspects of the present disclosure may be encoded upon one or more non-transitory computer-readable media with instructions for one or more processors or processing units to cause steps to be performed. It shall be noted that the one or more non-transitory computer-readable media shall include volatile and/or non-volatile memory. It shall be noted that alternative implementations are possible, including a hardware implementation or a software/hardware implementation. Hardware-implemented functions may be realized using ASIC(s), programmable arrays, digital signal processing circuitry, or the like. Accordingly, the "means" terms in any claims are intended to cover both software and hardware implementations. Similarly, the term "computer-readable medium or media" as used herein includes software and/or hardware having a program of instructions embodied thereon, or a combination thereof. With these implementation alternatives in mind, it is to be understood that the figures and accompanying description provide the functional information one skilled in the art would require to write program code (i.e., software) and/or to fabricate circuits (i.e., hardware) to perform the processing required.

It shall be noted that embodiments of the present disclosure may further relate to computer products with a non-transitory, tangible computer-readable medium that have computer code thereon for performing various computer-implemented operations. The media and computer code may be those specially designed and constructed for the purposes of the present disclosure, or they may be of the kind known or available to those having skill in the relevant arts. Examples of tangible computer-readable media include, for example: magnetic media such as hard disks, floppy disks, and magnetic tape; optical media such as CDs and holographic devices; magneto-optical media; and hardware devices that are specially configured to store or to store and execute program code, such as ASICs, programmable logic devices (PLDs), flash memory devices, other non-volatile memory (NVM) devices (such as 3D XPoint-based devices), and ROM and RAM devices. Examples of computer code include machine code, such as produced by a compiler, and files containing higher level code that are executed by a computer using an interpreter. Embodiments of the present disclosure may be implemented in whole or in part as machine-executable instructions that may be in program modules that are executed by a processing device. Examples of program modules include libraries, programs, routines, objects, components, and data structures. In distributed computing environments, program modules may be physically located in settings that are local, remote, or both.

One skilled in the art will recognize no computing system or programming language is critical to the practice of the present disclosure. One skilled in the art will also recognize that a number of the elements described above may be physically and/or functionally separated into modules and/or sub-modules or combined together.

It will be appreciated to those skilled in the art that the preceding examples and embodiments are exemplary and not limiting to the scope of the present disclosure. It is intended that all permutations, enhancements, equivalents, combinations, and improvements thereto that are apparent to those skilled in the art upon a reading of the specification and a study of the drawings are included within the true spirit and scope of the present disclosure. It shall also be noted that elements of any claims may be arranged differently including having multiple dependencies, configurations, and combinations.

What is claimed is:

1. A computer-implemented method comprising:
    receiving, at a storage subsystem, a communication from a host adapter related to accessing data at the storage subsystem, in which the communication comprises a Fibre Channel Identifier (FCID) and a Non-Volatile Memory Express (NVMe) Qualified Name (NQN) of the host adapter;
    using the FCID in the communication to query a login database that is communicatively coupled to the storage subsystem and that comprises, for a host adapter, an entry that associates the host adapter's FCID, World Wide Port Number (WWPN), and Non-Volatile Memory Express (NVMe) Qualified Name (NQN);
    responsive to the login database having an entry that matches the FCID, returning at least the NQN of the entry; and
    responsive to the NQN of the entry in the login database not matching the NQN in the communication, not granting the host adapter access to storage at the storage subsystem.

2. The computer-implemented method of claim 1 wherein the communication is:
    a Create Association (CASS) NVMe_LS request and the method further comprises the step of, responsive to the NQN of the entry in the login database not matching the NQN in the Create Association (CASS) NVMe_LS request, transmitting a Link Service (LS) reject; or
    a Fabrics Connect command and the method further comprises the step of, responsive to the NQN of the entry in the login database not matching the NQN in the Fabrics Connect command, transmitting a rejection.

3. The computer-implemented method of claim 1 further comprising:
    responsive to the NQN of the entry in the login database matching the NQN in the communication:
        using the NQN that was obtained from the login database to query a masking database that is communicatively coupled to the storage subsystem and that contains one or more entries, in which an entry associates a host adapter's NQN to a namespace identifier, which represents storage at the storage subsystem that has been allocated to that host adapter;
        responsive to the masking database not comprising an entry for the host adapter's NQN, not granting the host adapter access to storage at the storage subsystem; and
        responsive to the masking database comprising an entry for the host adapter's NQN, returning the namespace identifier in the entry to the host adapter and granting the host adapter access to the storage associated with the namespace identifier.

4. The computer-implemented method of claim 1 further comprising:
    responsive to the login database having an entry for the FCID but has mismatched NQNs, sending an alert regarding the mismatched NQNs for the host adapter.

5. The computer-implemented method of claim 1 wherein the storage subsystem is operating in a running mode.

6. The computer-implemented method of claim 5 further comprising:
    prior to placing the storage subsystem in the running mode, operating the storage subsystem in a learning mode.

7. The computer-implemented method of claim 6 further comprising:
    receiving, at a storage subsystem, a notification related to a zone in which the storage subsystem is identified as being a member, the notification being sent as a response to the zone being created in which a host adapter World Wide Port Number (WWPN) for a host adapter that is a member of the zone and a storage subsystem WWPN for the storage subsystem that is a member of the zone are associated with a zone identifier for the zone in a zone database;
    receiving a query from the host requesting a list of storage subsystem ports that are accessible to the host adapter;
    querying a name server database to obtain the list of storage subsystem ports that are accessible to the host adapter;

providing a response to the host adapter that includes a World Wide Port Number (WWPN) for the storage subsystem and a Fibre Channel identifier (FCID) for the storage subsystem;
receiving a port login (PLOGI) from the host adapter that includes a WWPN and FCID for the host adapter;
providing a PLOGI accept to the host adapter and adding the host adapter's WWPN and FCID to a login history database;
receiving a Create Association (CASS) NVMe_LS request from the host adapter that includes the host adapter's NVMe Qualified Name (NQN) and FCID; and
querying the login history database using the FCID to find an entry that corresponds to the FCID and adding the NQN to the entry.

8. A computer-implemented method comprising:
extracting, from one or more communications from a host adapter a Fibre Channel Identifier (FCID), World Wide Port Number (WWPN), and Non-Volatile Memory Express (NVMe) Qualified Name (NQN) of the host adapter;
storing the extracted FCID, WWPN, and NQN of the host adapter in an entry in a data store to record association between the FCID, WWPN, and NQN for that host adapter;
using the entry that associates the FCID and WWPN with NQN for the host adapter to compare whether FCID-NQN values or WWPN-NQN values in a communication from the host adapter related to accessing storage of a storage subsystem match with values in corresponding values in the entry; and
responsive to there being a mismatch, not granting the host adapter access to storage at the storage subsystem.

9. The computer-implemented method of claim 8, further comprising:
responsive to there not being a mismatch:
querying a masking data store comprising one or more NQN-namespace entries, in which an NQN-namespace entry associates a host adapter's NQN with one or more namespaces that represent storage at the storage subsystem that have been allocated to that host adapter with the associated NQN; and
responsive to the masking data store having an NQN-namespace entry with the NQN, grant the host adapter access to the associated one or more namespaces.

10. The computer-implemented method of claim 8 wherein the step of using the entry that associates the FCID and WWPN with NQN for the host adapter to compare whether FCID-NQN values or WWPN-NQN values in a communication from the host adapter related to accessing storage of a storage subsystem match with values in corresponding values in the entry comprises:
using the FCID in the communication to query a login database that is communicatively coupled to the storage subsystem and that comprises, for a host adapter, an entry that associates the host adapter's FCID, World Wide Port Number (WWPN), and Non-Volatile Memory Express (NVMe) Qualified Name (NQN);
responsive to the login database having an entry that matches the FCID, returning at least the NQN of the entry; and
responsive to the NQN of the entry in the login database not matching the NQN in the communication, not granting the host adapter access to storage at the storage subsystem.

11. The computer-implemented method of claim 9 further comprising:
responsive to a login database having an entry for the FCID but has mismatched NQNs, sending an alert regarding the mismatched NQNs for the host adapter.

12. The computer-implemented method of claim 8 wherein the steps of extracting, from one or more communications from a host adapter a Fibre Channel Identifier (FCID), World Wide Port Number (WWPN), and Non-Volatile Memory Express (NVMe) Qualified Name (NQN) of the host adapter, and storing the extracted FCID, WWPN, and NQN of the host in an entry in a data store to record association between the FCID, WWPN, and NQN for that host adapter are performed during a learning mode.

13. The computer-implemented method of claim 12 further comprising:
responsive to being in a running mode, not allowing new entries to be added to the data store.

14. The computer-implemented method of claim 8 further comprising:
using one or more of the entries in the data store that record associations between the FCID, WWPN, and NQN for host adapters to populate a listing; and
supplying at least part of the listing to an administrator to aid the administrator in forming the entry in a masking database that correlates the host adapter's NQN to a namespace.

15. An information handling system comprising:
one or more processors; and
a non-transitory computer-readable medium or media comprising one or more sets of instructions which, when executed by at least one of the one or more processors, causes steps to be performed comprising:
receiving, at a storage subsystem, a communication from a host adapter related to accessing data at the storage subsystem, in which the communication comprises a Fibre Channel Identifier (FCID) and a Non-Volatile Memory Express (NVMe) Qualified Name (NQN) of the host adapter;
using the FCID in the communication to query a login database that is communicatively coupled to the storage subsystem and that comprises, for a host adapter, an entry that associates the host adapter's FCID, World Wide Port Number (WWPN), and Non-Volatile Memory Express (NVMe) Qualified Name (NQN);
responsive to the login database having an entry that matches the FCID, returning at least the NQN of the entry; and
responsive to the NQN of the entry in the login database not matching the NQN in the communication, not granting the host adapter access to storage at the storage subsystem.

16. The information handling system of claim 15 wherein the communication is:
a Create Association (CASS) NVMe_LS request and the non-transitory computer-readable medium or media further comprises one or more sets of instructions which, when executed by at least one of the one or more processors, causes steps to be performed comprising:
responsive to the NQN of the entry in the login database not matching the NQN in the Create Association (CASS) NVMe_LS request, transmitting a Link Service (LS) reject; or
a Fabrics Connect command and the non-transitory computer-readable medium or media further comprises one or more sets of instructions which, when executed by at least one of the one or more processors, causes steps to be performed comprising:

responsive to the NQN of the entry in the login database not matching the NQN in the Fabrics Connect command, transmitting a rejection.

17. The information handling system of claim 15 wherein the non-transitory computer-readable medium or media further comprises one or more sets of instructions which, when executed by at least one of the one or more processors, causes steps to be performed comprising:

responsive to the NQN of the entry in the login database matching the NQN in the communication:
  using the NQN that was obtained from the login database to query a masking database that is communicatively coupled to the storage subsystem and that contains one or more entries, in which an entry associates a host adapter's NQN to a namespace identifier, which represents storage at the storage subsystem that has been allocated to that host adapter;
  responsive to the masking database not comprising an entry for the host adapter's NQN, not granting the host adapter access to ftfly storage at the storage subsystem; and
  responsive to the masking database comprising an entry for the host adapter's NQN, returning the namespace identifier in the entry to the host adapter and granting the host adapter access to the storage associated with the namespace identifier.

18. The information handling system of claim 15 wherein the non-transitory computer-readable medium or media further comprises one or more sets of instructions which, when executed by at least one of the one or more processors, causes steps to be performed comprising:

responsive to the login database having an entry for the FCID but has mismatched NQNs, sending an alert regarding the mismatched NQNs for the host adapter.

19. The information handling system of claim 15 wherein the non-transitory computer-readable medium or media further comprises one or more sets of instructions which, when executed by at least one of the one or more processors, causes steps to be performed comprising:

placing the storage subsystem in a learning mode.

20. The information handling system of claim 19, wherein the non-transitory computer-readable medium or media further comprises one or more sets of instructions which, when executed by at least one of the one or more processors, causes steps to be performed comprising:

receiving, at a storage subsystem, a notification related to a zone in which the storage subsystem is identified as being a member, the notification being sent as a response to the zone being created in which a host adapter World Wide Port Number (WWPN) for a host adapter that is a member of the zone and a storage subsystem WWPN for the storage subsystem that is a member of the zone are associated with a zone identifier for the zone in a zone database;

receiving a query from the host requesting a list of storage subsystem ports that are accessible to the host adapter;

querying a name server database to obtain the list of storage subsystem ports that are accessible to the host adapter;

providing a response to the host adapter that includes a World Wide Port Number (WWPN) for the storage subsystem and a Fibre Channel identifier (FCID) for the storage subsystem;

receiving a port login (PLOGI) from the host adapter that includes a WWPN and FCID for the host adapter;

providing a PLOGI accept to the host adapter and adding the host adapter's WWPN and FCID to the login database;

receiving a Create Association (CASS) NVMe_LS request from the host adapter that includes the host adapter's NVMe Qualified Name (NQN) and FCID; and querying the login database using the FCID to find an entry that corresponds to the FCID and adding the NQN to the entry.

* * * * *